United States Patent [19]

Takata

[11] Patent Number: 4,691,156
[45] Date of Patent: Sep. 1, 1987

[54] VARIABLE FREQUENCY POWER UNIT CONTROLLING SYSTEM

[75] Inventor: Nobuharu Takata, Hyogo, Japan

[73] Assignee: Mitsubishi Denki Kabushiki Kaisha, Tokyo, Japan

[21] Appl. No.: 698,850

[22] Filed: Feb. 6, 1985

[30] Foreign Application Priority Data

Apr. 2, 1984 [JP] Japan .................................. 59-65419
Apr. 2, 1984 [JP] Japan .................................. 59-65420
Apr. 2, 1984 [JP] Japan .................................. 59-65421

[51] Int. Cl.⁴ .............................................. H02P 5/40
[52] U.S. Cl. ..................................... 318/798; 318/806
[58] Field of Search .................. 318/798, 806; 361/23, 361/24, 30, 31

[56] References Cited

U.S. PATENT DOCUMENTS 3,576,485 4/1971 Coons, Jr. et al. ................. 318/327
3,671,831 6/1972 Chausse et al. ...................... 318/800
3,778,696 12/1973 Walters et al. ...................... 318/565
3,790,778 2/1974 Oster .................................... 318/327

FOREIGN PATENT DOCUMENTS 58-6077 2/1983 Japan .

Primary Examiner—David Smith, Jr.
Attorney, Agent, or Firm—Bernard, Rothwell & Brown

[57] ABSTRACT

A variable frequency power unit controlling system for controlling a variable frequency power unit to supply an electric current of a frequency corresponding to a desired revolving rate of an electric motor. A control signal designating the revolving rate of the electric motor is integrated by an integrating circuit and the output frequency of the variable frequency power unit is held at a predetermined value regardless of the control signal, when the change rate of the output signal of the integrating circuit deviates from a predetermined range of change rate.

9 Claims, 12 Drawing Figures

VARIABLE FREQUENCY POWER UNIT CONTROLLING SYSTEM

BACKGROUND OF THE INVENTION

1. Field of the Invention

The present invention relates to a variable frequency power unit system for driving a rotary machine such as a fan or a pump by a variable frequency power unit (hereinafter referred to as "VF PWU") and more particularly to a VF PWU operating system for controlling a VF PWU in case an abnormal control signal is given to the VF PWU due to an accident such as disconnection or short-circuit.

2. Description of the Prior Art

A conventional VF PWU system of this kind is shown in FIG. 1, in which there are shown a commercial power supply line 1, a VF PWU 2B, a motor 3, a rotary machine 4, a control unit 5A, a control signal 6, a control signal line 7A for sending a control signal from the control unit 5A to the VF PWU 2B, a coupling device 8 for mechanically coupling the motor 3 and the rotary machine 4, and a switch 9.

In FIGS. 2 and 3, $t_1$ and $t_3$ depict times when an increase command and a decrease command are given by means of the control signal 6 respectively, $t_2$ and $t_4$ times when the output of the VF PWU 2B has completed the increase and the decrease, respectively, $t_5$ time when an accident occurred in the signal line 7A and $t_6$ time when the change of the output of the VF PWU 2B is completed.

The manner of operation of the VF PWU system will be described hereinbelow. In order to describe the manner of operation concretely, the rotary machine 4 is supposed to be a fan which provides an output (air flow) supplied to a boiler, not shown, installed in a power plant.

Referring to FIG. 1, electric power is supplied from the commercial power supply line 1 through the switch 9 to the VF PWU 2B and the VF PWU 2B provides an output to drive the motor 3. The revolving rate n of the motor 3 is defined by $$n = \frac{120 \times F}{P} \qquad (1)$$

where n is revolving rate of the motor, F is the frequency of the power supplied to the motor and P is the number of poles of the motor.

As clear from equation (1), the revolving rate n is proportional to the frequency F of the power supplied to the motor, namely, the output frequency F of the VF PWU 2B, and hence the revolving rate n of the motor 3 varies according to the output frequency F.

The motor 3 and the fan 4 are coupled directly to each other through a coupling 8 and the fan supplies air to the boiler at a rate approximately proportional to the revolving rate n of the motor 3.

In the power plant, when the power demand of the associated power grid changes or the fuel supply rate of the boiler changes, the air demand Q of the boiler, i.e., air supply rate Q, changes accordingly. In such a case, a control command 6 to change the air supply rate Q is given to the control unit 5A, and then the control unit 5A gives a command signal through the signal line 7A to the VF PWU 2B. Then, the VF PWU 2B provides a power of a frequency F corresponding to the air demand Q.

FIG. 2 is a time chart of the normal operation of the conventional VF PWU system shown in FIG. 1. When the control command 6 requires the increase of the air supply rate Q at time $t_1$ and the decrease of the air supply rate Q to the original level at $t_3$, the control unit 5A issues the corresponding output signals through the signal line 7A to the VF PWU 2B accordingly. Ordinarily, the VF PWU 2B is so designed that the output thereof changes at a fixed increasing rate or a fixed decreasing rate. Accordingly, the output frequency F of the VF PWU 2B changes gradually from the times $t_1$ and $t_3$ when the air supply rate increasing command and the air supply rate decreasing command are given respectively and reaches the frequencies corresponding to the commands with a delay at times $t_2$ and $t_4$ respectively. That is, when the air supply rate Q of the fan 4 needs to be changed, the revolving rate n of the motor 3 is controlled by changing the output frequency of the VF PWU 2B.

FIG. 3 is a time chart of the abnormal operation of the conventional VF PWU system shown in FIG. 1 where a trouble, such as the disconnection of the signal line 7A, the loosening of the terminal or the falling off of the terminal, has arisen. In such a case, as a matter of course, the control command 6 remains unchanged and commands a fixed air supply rate Q. If the signal line 7A is disconnected at time $t_5$, no control signal is given to the VF PWU 2B. Consequently, the output frequency F of the VF PWU 2B changes, as explained with reference to FIG. 2, to a lower limit value with a delay causing the resultant decrease of the revolving rate n of the motor 3, hence the reduction of the air supply rate Q of the fan 4.

As the conventional VF PWU controlling system functions in the manner as described hereinbefore, a failure such as the disconnection of the signal line for transmitting a control signal given by the VF PWU control unit to the VF PWU causes the useless change in the output frequency of the VF PWU 2B, which disturbs the operation of the motor 3, hence the operation of the rotary machine, thereby to cause the resultant malfunction of the entire system.

SUMMARY OF THE INVENTION

Accordingly, it is an object of the present invention to provide a VF PWU controlling system capable of detecting the change of the control signal for controlling the output frequency of a VF PWU and of controlling the change in the output frequency of the VF PWU on the basis of the result of detection of the change in the control signal so that the sudden change in the revolving rate of the associated motor is prevented even if the control signal should change abnormally.

A VF PWU controlling system for controlling the revolving rate of a rotary machine coupled with an electric motor by regulating the frequency of a driving current supplied to the electric motor according to the present invention comprises integrating a control signal designating a revolving rate of a rotary machine by an integrating circuit; detecting the deviation of the change rate of the control signal given to the integrating circuit from a predetermined range of change rate by a change rate detector; and checking the alteration of the output frequency of the VF PWU on the basis of the output signal of the change rate detector when the change rate deviates from the predetermined range of change rate.

In another aspect of the present invention, the motor is disconnected from the VF PWU and connected to a commercial AC power source when the abnormal change of the control signal is detected.

In a further aspect of the present invention, the output frequency of the VF PWU is raised at a predetermined raising rate to the upper limit value of the range of variation, namely, to a frequency equivalent to the frequency of the commercial AC power source, prior to the change of the power source of the motor from the VF PWU to the commercial AC power source when an abnormal control signal is given.

DETAILED DESCRIPTION OF THE PREFERRED EMBODIMENTS

Figure 1:
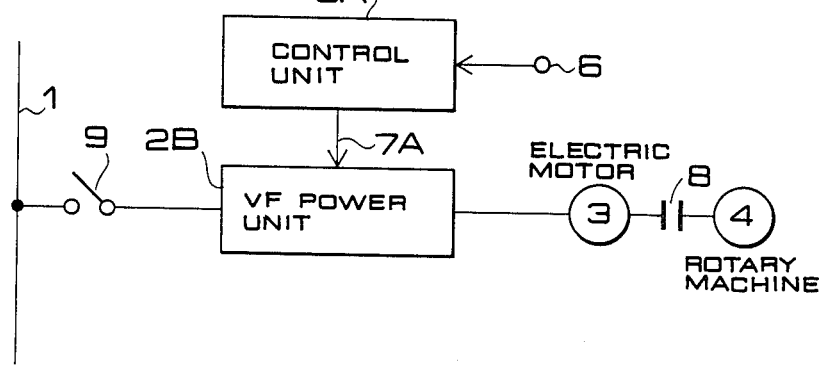
FIG. 1 is a block diagram showing a conventional motor speed controlling system including a VF PWU.
Figure 2:
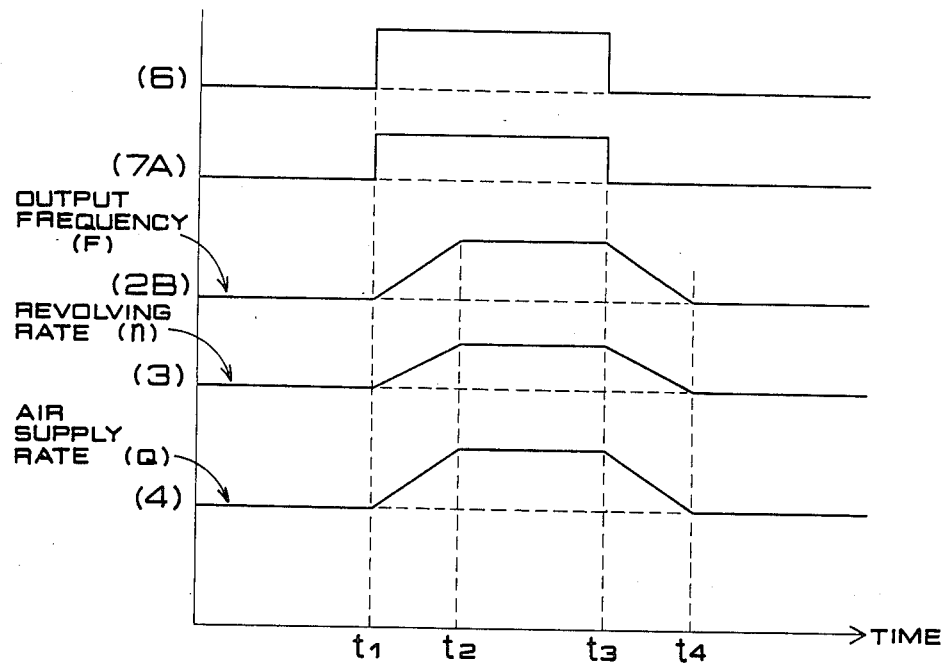
FIGS. 2 and 3 are waveform diagrams of the control signals of the motor speed controlling system of FIG. 1 and controlled signals.
Figure 3:
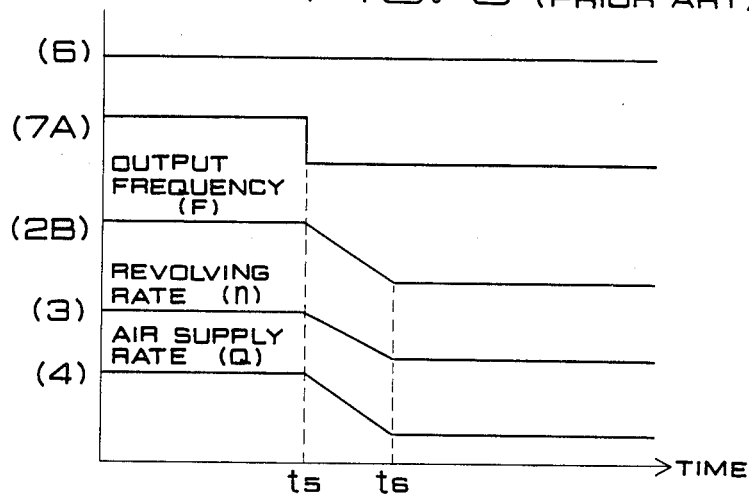

Preferred embodiments of the present invention will be described hereinafter in connection with the accompanying drawings. The same reference numerals designate the equivalent parts through FIGS. 1 and 4.

Figure 4:
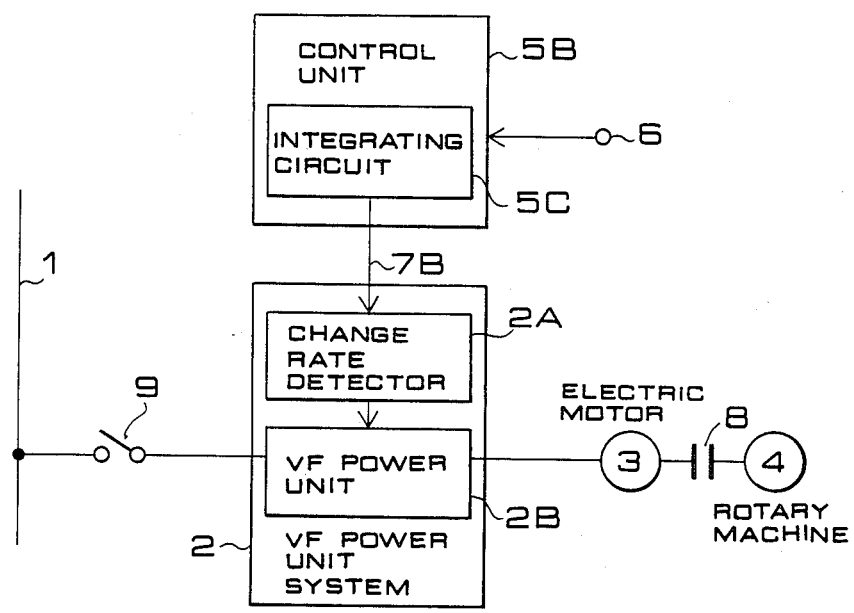
FIG. 4 is a block diagram of a motor speed controlling system including a VF PWU for carrying out the VF PWU controlling system, in a first embodiment, of the present invention.

In FIG. 4 indicated at 2 is a VF PWU system comprising a VF PWU 2B and a change rate detector 2A, at 5B is a control unit, at 5C is an integrating circuit, at 7B is a signal line for transmitting the output signal of the control unit 5B to the VF PWU system 2 and at 9 is a switch.

While the VF PWU system is normal, the integrating circuit 5C integrates a control signal 6 supplied thereto so that the output signal of the control unit 5B changes at a rate within a predetermined change rate range even if the control signal 6 is a step-functional signal. The change rate detector 2A of the VF PWU system inspects whether or not the change rate of the output signal of the control unit 5B is within a predetermined range and gives an output signal when the change rate is not within the predetermined range. Accordingly, it is decided that the output signal of the control unit 5B is transmitted directly to the VF PWU 2B while any output signal is provided by the change rate detector. If the signal line 7B has become abnormal due to an accident such as disconnection when the change rate detector provides an output signal, then the alteration of the output of the VF PWU 2B is checked by the output signal of the change rate detector to maintain the existing operating condition.

Figure 5:
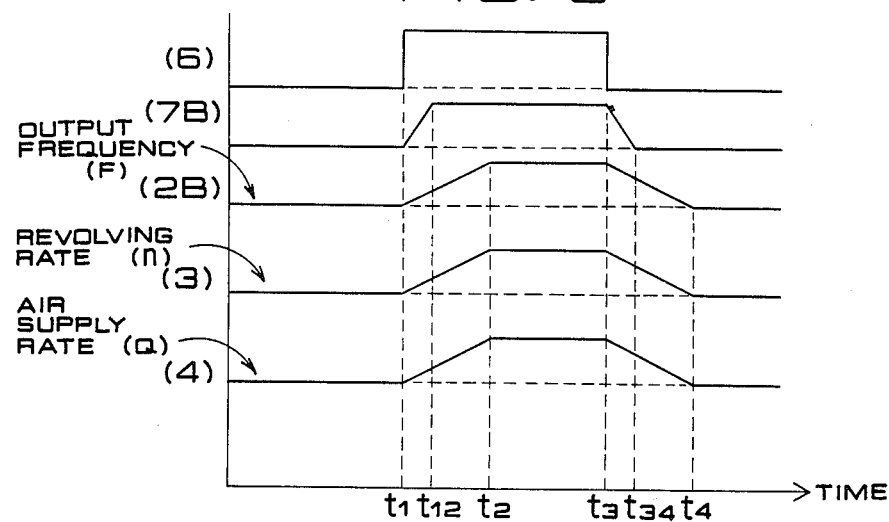
FIGS. 5 and 6 are waveform diagrams of the control signals of the motor speed controlling system of FIG. 4 and controlled signals.
Figure 6:
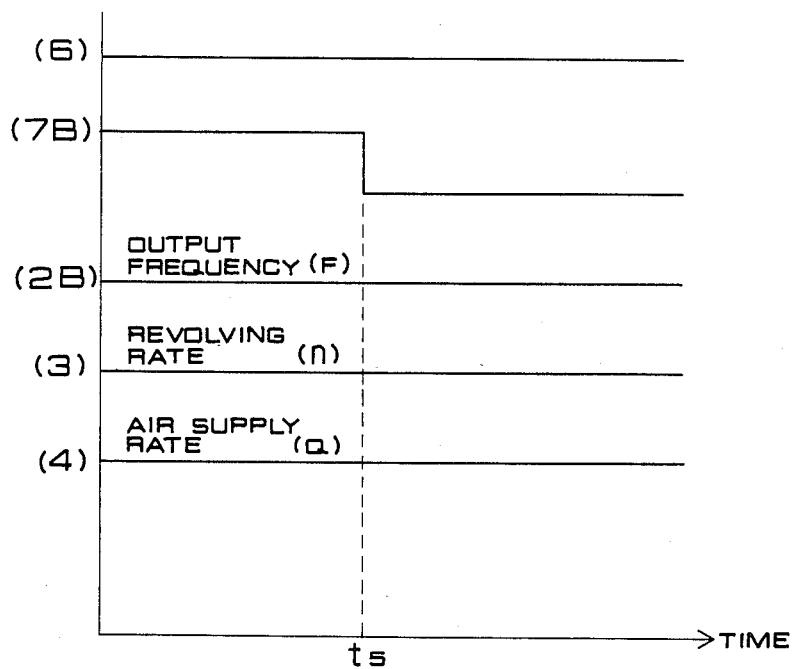
Figure 7:
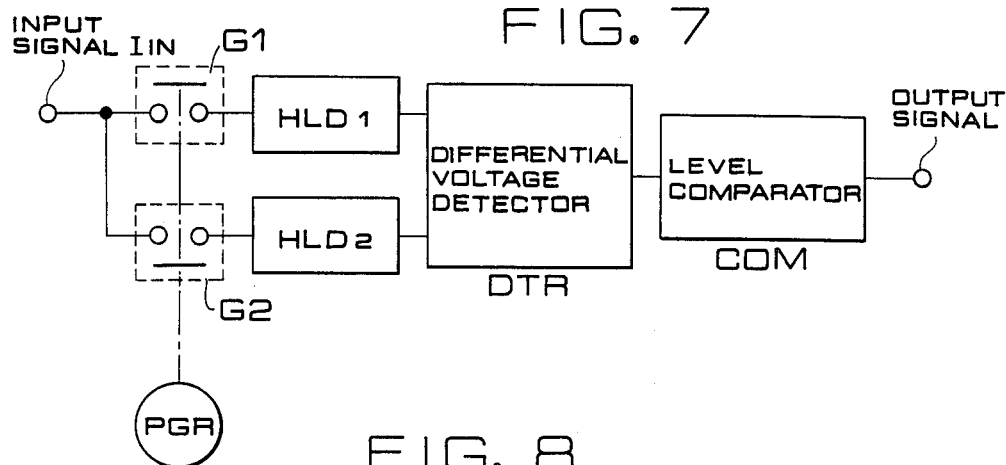
FIG. 7 is a block diagram of the change rate detector of the motor speed controlling system of FIG. 4.
Figure 8:
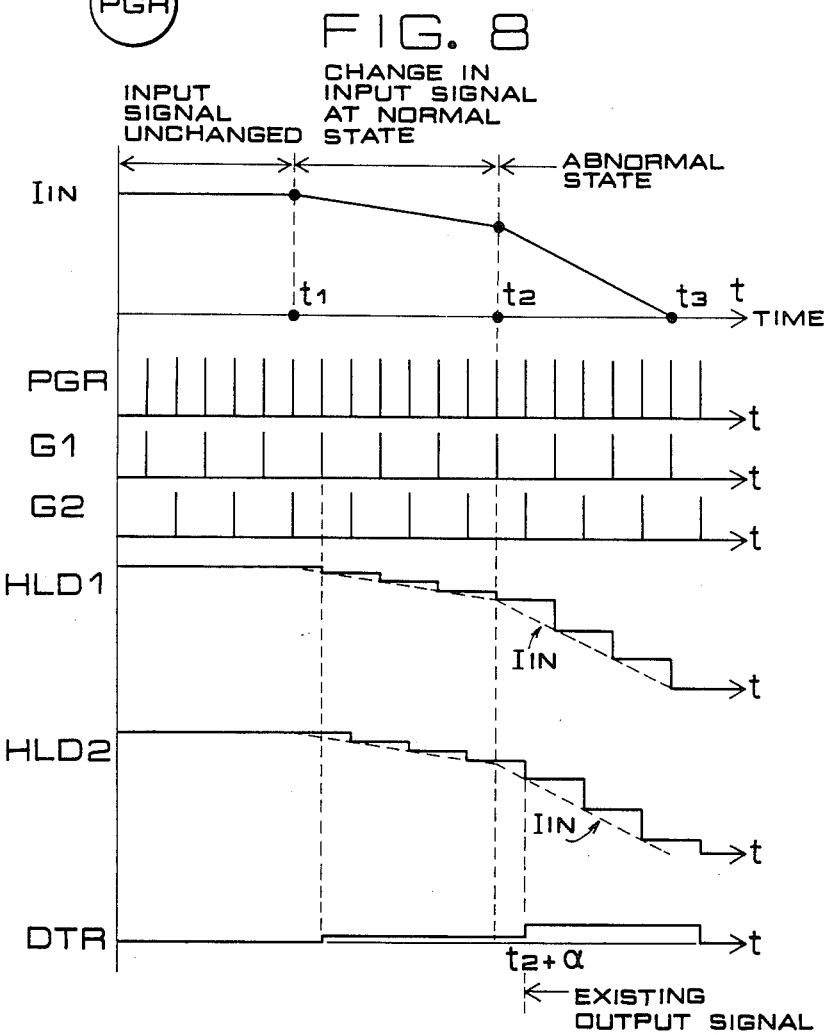
FIG. 8 is a waveform diagram of the control signals of the change rate detector of FIG. 7.

FIGS. 5 and 6 are time charts showing the relations between the control signals of the VF PWU system of FIG. 4 and the controlled signals. In FIG. 5, $t_{12}$ and $t_{34}$ indicate times when the changes, increasing change and decreasing change, are completed according to the integrated input control signal given to the control unit 5B, In FIG. 6, $t_5$ indicates the time when an accident, such as disconnection, occurred in the signal line 7B. FIG. 7 shows the constitution of the change rate detector and FIG. 8 is a diagram showing the actions of the change rate detector. In the drawings, indicated at $I_{IN}$ is an input signal, at $G_1$ and $G_2$ are selector switches, at PGR is a pulse generator, at HLD1 and HLD2 are holding circuits, at DTR is a differential voltage detector and at COM is a magnitude comparator.

The action of the motor speed controlling system of FIG. 4 for carrying out a VF PWU controlling system of the present invention will be described hereinafter.

Referring to FIG. 5 showing a time chart of the control and controlled signals in the normal operation of the VF PWU system, the control signal 6 rises up to a fixed magnitude at time $t_1$ and decreases down to the original magnitude at time $t_3$, for example. Since the control unit 5B has an integrating characteristics, its output signal given to the signal line 7B assumes a form of variation as shown in FIG. 5. The rate of change of the signal 7B from the integrator 5C is limited to a range between the positive rate of change shown by the rising waveform slope of 7B in FIG. 5 and the negative rate of change shown by the decreasing waveform slope of 7B in FIG. 5. The VF PWU 2B decides such a changing rate of the output signal of the control unit to be normal and changes its output signal according to the input signal given thereto. Consequently, the revolving rate of the motor 3 and the air supply rate Q of the fan 4 changes accordingly.

FIG. 6 shows the changes of the control and controlled signals in the case of accident, such as disconnection, in the signal line 7B, in which it is supposed that an accident occurred in the signal line 7B at time $t_5$, while any particular change in the control signal 6 has not occurred. Then, the change rate detector 2A of the VF PWU 2B detects the sudden change, i.e., abnormal change, in the input signal received through the signal line 7B, and then provides an output signal to check the alteration of the output frequency of the VF PWU 2B. Consequently, the revolving rate n of the motor 3 and the air supply rate of the fan 4 remain unchanged.

The functions of the change rate detector will be described in connection with FIG. 8. The PGR continuously generates a pulse signal of a fixed frequency. The selector switches $G_1$ and $G_2$ respond alternately to the pulse signal to send the instantaneous value of the input signal $I_{IN}$ to the corresponding holding circuits HLD1 and HLD2.

Supposing that the input signal $I_{IN}$ varies in a mode as shown in FIG. 8, the holding circuits HLD1 and HLD2 hold the instantaneous values of the input signal $I_{IN}$ and provide output signals of waveforms as shown in FIG.

8 respectively. The differential voltage detector DTR detects the difference between the levels of the output signals of the holding circuits HLD1 and HLD2 and decides that the input signal $I_{IN}$ has changed abnormally, when the detected difference exceeds a predetermined value (at time $t_2+\alpha$), and then provides an output signal. The value of $\alpha$ corresponds to the pulse interval of the pulse signal generated by the pulse generator PGR.

Although the invention has been described as applied to controlling the revolving rate, namely, the air supply rate, of a fan of a power plant, the present invention is effectively applicable to controlling the operation of rotary machines, such as pumps, other than a fan or to controlling various systems other than the system of a power plant.

Furthermore, the abnormal condition is not limited to the disconnection of the signal line 7B, but may be short-circuit or the abnormal increase or decrease of the output signal of the control unit due to the malfunction of the control unit and the VF PWU controlling system functions in the same manner for those troubles. Accordingly, the change rate detector is capable of being set so that the detection of a change rate greater than a predetermined upper limit value or a change rate less than a predetermined lower limit value is possible.

Thus, according to the present invention, the control unit integrates a control signal given thereto and gives an output control signal having a change rate within a predetermined change rate range to the VF PWU, while the change rate detector of the VF PWU detects the deviation of the change rate of the input signal from a predetermined range and provides an output signal to check the alteration of the output of the VF PWU so that the existing output mode is maintained, therefore, the normal operation of the associated system can be continued even if an abnormal control signal is given to the VF PWU.

Figure 9:
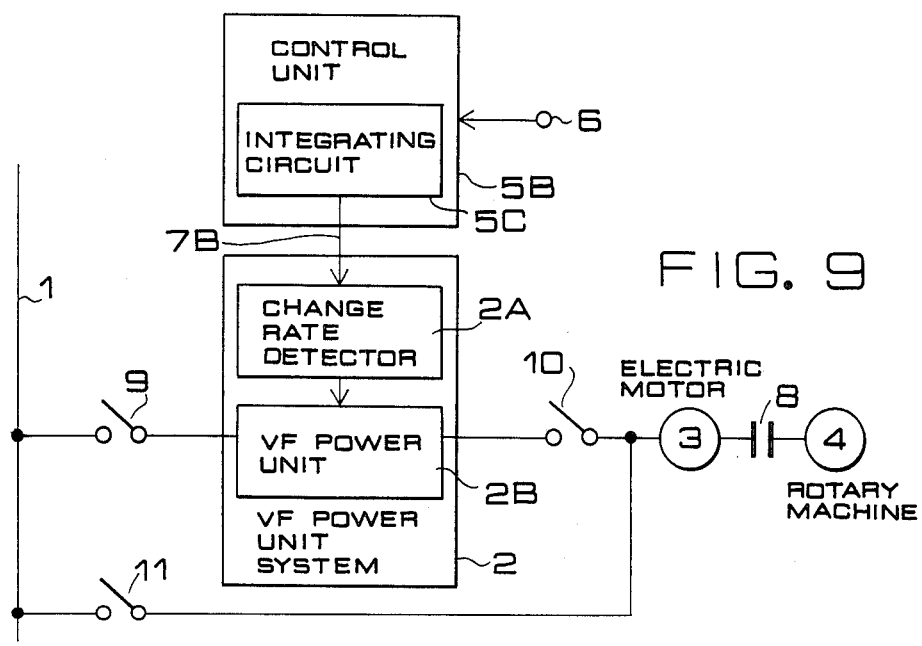
FIG. 9 is a block diagram of a motor speed controlling system including a VF PWU for carrying out a VF PWU controlling system, in a second embodiment, of the present invention.

FIG. 9 shows another motor speed controlling system for carrying out a VF PWU controlling system, in a second embodiment, of the present invention. The constitutions of a control unit 5B and a VF PWU system 2 employed in this motor speed controlling system are the same as those of the motor speed controlling system of FIG. 4. In this system, a motor 3 is connected through switches 10 and 11 to a VF PWU 2B and to a commercial power supply line 1 respectively.

The manner of operation of the motor speed controlling system of FIG. 9 will be described hereinafter.

Supposing that the switches 9 and 10 are closed and the switch 11 is opened, a supply voltage is applied to the VF PWU 2B through the commercial power supply line 1. The VF PWU 2B supplies power to the motor 3, and thereby the fan 4 is driven. A control signal 6, namely, an air supply rate change command signal, is supplied to the control unit 5B. The integrating circuit 5C of the control unit 5B integrates the control signal 6 to transduce the same into an output control signal, which is given through the signal line 7B to the VF PWU system 2. The change rate detector 2A, a component of the VF PWU system 2, examines the output control signal given to the VF PWU system 2. When the output control signal is found to be normal, the output frequency F of the VF PWU system 2B is altered to a value corresponding to the output control signal. When abnormal, the switches 9 and 10 are opened and the switch 11 is closed. The functions of the change rate detector is apparent from the description thereof given hereinbefore in connection with FIG. 7.

Figure 10:
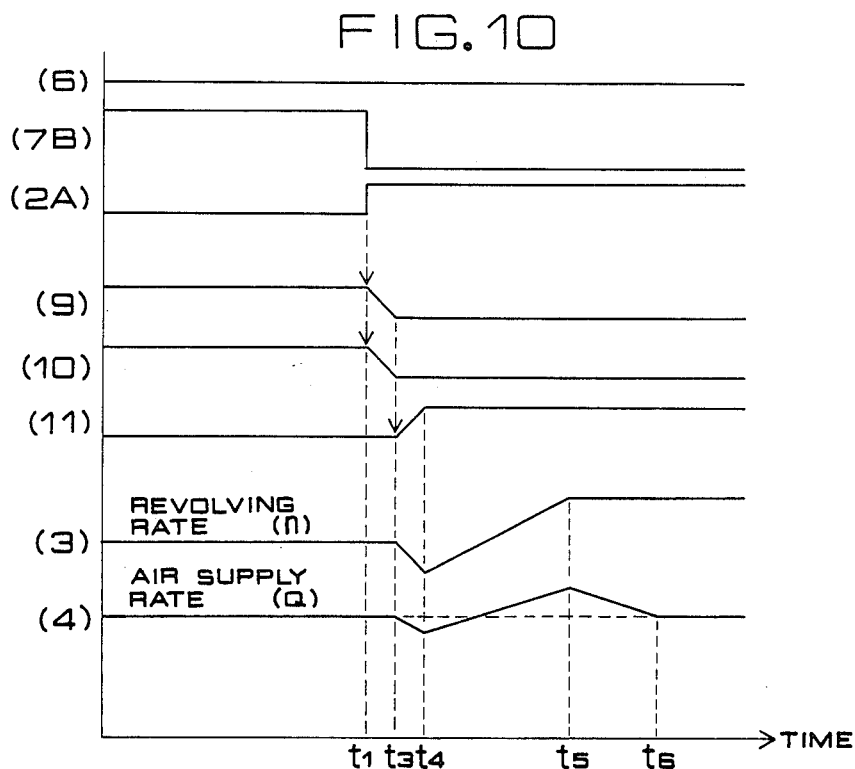
FIG. 10 is a waveform diagram of the motor speed controlling system of FIG. 9.

Accordingly, an abnormal change rate is detected immediately by the change rate detector 2A even if the signal line 7B connecting the control unit 5B to the VF PWU system 2 is disconnected at a time $t_1$ as shown in FIG. 10. Then, the switches 9 and 10 are opened at time $t_3$ and the switch 11 is closed at time $t_4$. Since power supply to the motor 3 is interrupted temporarily when the switches 9 and 10 are opened, the revolving rate of the motor 3 drops slightly. However, the revolving rate of the motor 3 starts rising again as soon as the switch 11 is closed immediately after the switches 9 and 10 are opened and reaches a revolving rate corresponding to the frequency of the commercial power source connected through the commercial power supply line 1 and the switch 11 to the motor 3. When the rotary machine 4 is a fan, the air supply rate Q can be controlled also by means of a mechanical inlet vane (or a damper) provided in the air supply duct, in addition to controlling the revolving rate n of the motor 3. While the air supply rate Q is controlled by controlling the revolving rate n of the motor 3, the inlet vane is almost fully opened to avoid unnecessary loss of power. Therefore, if the opening of the inlet vane is left at a degree for an air supply rate control mode in which the revolving rate n of the motor is controlled, the air supply rate will increase excessively when the revolving rate n of the motor 3 rises up to a revolving rate corresponding to the frequency of the commercial power source. Accordingly, it is necessary to reduce the opening of the inlet vane so that air flow is restricted when the change rate detector 2A detected an abnormal change of the output control signal, and thereby the switches 9 and 10 were opened and the switch 11 was closed.

Consequently, as shown in FIG. 10, the air supply rate Q tends to decrease temporarily upon the opening of the switches 9 and 10, and then starts increasing after the switch 11 has been closed. Ordinarily, the response of the inlet vane delays relatively to the increase of the air supply rate Q resulting from the rise of the revolving rate n of the motor 3. Therefore, the air supply rate Q increases moderately up to an excessively high level due to the retarding effect of the delayed action of the inlet vane, and then starts decreasing gradually due to the restrictive effect of the inlet vane after the revolving rate n of the motor 3 has reached a revolving rate corresponding to the frequency of the commercial power source at time $t_5$ and reaches the normal level at time $t_6$.

Although the air supply rate Q varies due to the unavoidable unmatched variation of the revolving rate n of the motor 3 and the variation of the opening of the inlet vane, the variation of the air supply rate Q is confined within a tolerable range of the system, and hence the system operates safely even if an abnormal output control signal should be given.

Figure 11:
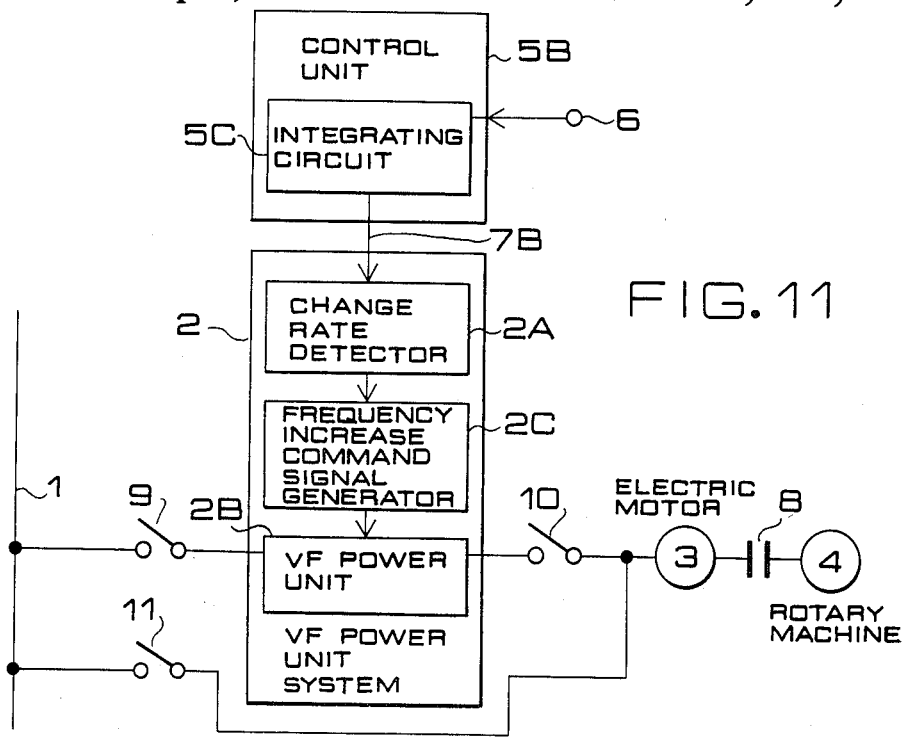
FIG. 11 is a block diagram of a motor speed controlling system including a VF PWU for carrying out a VF PWU controlling system, in a third embodiment, of the present invention and controlled signals.

FIG. 11 shows a motor speed control system for carrying out a VF PWU controlling system, in a third embodiment, of the present invention. In this motor speed control system, a VF PWU system 2 comprises a change rate detector 2A which provides an output signal when the change rate of an output control signal provided by a control unit 5B deviates from a predetermined range and a frequency increase command signal generator 2C which, upon the reception of the output signal of the change rate detector 2A, causes the output frequency F of a VF PWU to rise gradually up to the upper limit of the output frequency. In this motor speed control system, switches 9 and 10 are opened after the output frequency of the VF PWU 2B has reached the upper limit, and then a switch 11 is closed after a predetermined time from the opening of the switches 9 and 10.

Figure 12:
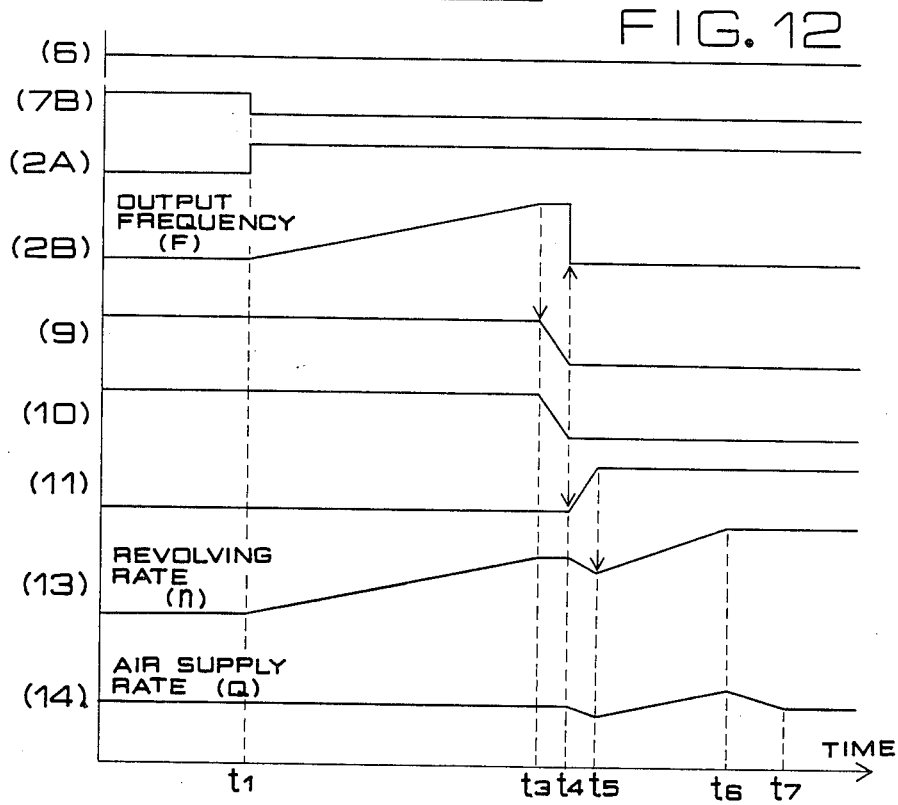
FIG. 12 is a waveform diagram of the control signals of the motor speed control system of FIG. 11 and controlled signals.

Accordingly, as shown in FIG. 12, when an abnormality, such as the disconnection of a signal line connecting the control unit 5B to the VF PWU system 2, at time $t_1$ is detected immediately by the change rate detector 2A, and then the output frequency F of the VF PWU 2B is caused to rise gradually up to the upper limit. After the output frequency F has reached the upper limit, the switches 9 and 10 are opened at time $t_4$ and the switch 11 is closed at time $t_5$. The revolving rate n of the motor 3 increases gradually and reaches a revolving rate corresponding to the upper limit of the output frequency at time $t_3$. Opening the switches 9 and 10 interrupts power supply to the motor 3 temporarily, and hence the revolving rate n of the motor 3 decreases slightly. Closing of the switch 11 successive to the opening of the switches 9 and 10 causes the revolving rate n of the motor 3 to start increasing again and to reach a revolving rate corresponding to the frequency of the commercial power source at time $t_6$. In case the rotary machine 4 is a fan, the air supply rate Q can be controlled also by means of a mechanical vane or a damper, not shown, in addition to controlling the revolving rate n of the motor. In this case, the inlet vane is of the automatic positioning type designed so that the inlet vane is fixed at the fully open position to avoid unnecessary power loss while the air supply rate Q is controlled by regulating the revolving rate n of the motor and the opening of the inlet vane is adjusted automatically according to an air supply rate control signal when the change rate detector 2A provides a control signal upon the detection of any abnormality. That is, the opening of the inlet vane is reduced as the revolving rate n of the motor increases, to restrict the excess increase of the air flow rate Q resulting from the increasing revolving rate n of the motor so that the air supply rate Q is held at a fixed value regardless of the revolving rate n of the motor. Since the output frequency F increases slowly between the times $t_1$ and $t_3$, the alteration of the opening of the inlet vane can be performed without delay with respect to the increase of the revolving rate of the motor, and hence the air supply rate Q remains constant.

As shown in FIG. 12, the air supply rate Q tends to decrease from time $t_4$ when the switches 9 and 10 are opened, and then starts increasing from time $t_5$ when the switch 11 is closed. Ordinarily, the response of the inlet vane delays relatively to the increase of the air supply rate Q resulting from the rapid rise of the revolving rate n of the motor. Therefore, the air supply rate Q increases moderately due to the retarding effect of the delayed action of the inlet vane up to an excessively high level, and then starts decreasing after the revolving rate n of the motor has reached a revolving rate corresponding to the frequency of the commercial power source at $t_6$ and reaches the normal level at time $t_7$.

Although the air supply rate Q varies due to the unavoidable unmatched variation of the revolving rate n of the motor and the variation of the opening of the inlet vane, the variation of the air supply rate Q is confined within a tolerable range of the system, and hence the system operates safely even if an abnormal output control signal should be given. Since the power source of the motor is switched from the VF PWU 2B to the commercial power source after the output frequency F of the VF PWU 2B has been raised to the upper limit by the agency of the frequency increase command generator 2C, the extent of variation of the output frequency F in changing the power source from the VF PWU 2B to the commercial power source is smaller than that in changing the power source directly from the VF PWU 2B to the commercial power source, and hence the variation of the air supply rate Q also is confined within a small extent and the system can be operated safely.

In the description given above, the output frequency F of the VF PWU 2B is raised immediately after the change rate detector 2A has provided a control signal, however; the output frequency F of the VF PWU 2B may be raised after being maintained as it stands for a predetermined period of time after the change rate detector 2A has provided a control signal.

While the invention has been described in its preferred embodiments, it is to be understood that the invention is not limited in its application to the details of construction and arrangement illustrated in the accompanying drawings and that the invention may be practiced otherwise than as specifically described without departing from the scope and spirit of the invention.

What is claimed is:

1. A variable frquency power system with fault prevention for controlling the rotary speed of a rotary machine driven by an A.C. electric motor by regulating the frquency of an A.C. electric current supplied to the electric motor, comprising:

a control unit for generating a D.C. electric control signal designating the rotary speed of the rotary machine;

said control unit including an integrating circuit for integrating the control signal to prevent any rate of change of the control signal from having a value outside a predetermined range;

a signal line connected to the output of the integrating circuit for transmitting the control signal;

variable frequency power means for receiving the control signal from the signal line and for generating the A.C. electric current with a frequency which varies in accordance with the magnitude of he control signal;

said variable frequency power means including a change rate detector for detecting the rate of change in the received control signal and for generating a fault signal when the detected rate of change has a value outside the predetermined range; and means responsive to the fault signal of the change rate detector for restricting any change of the frequency of the variable frequency electric current supplied to the electric motor to prevent any fault in the rotary speed of the rotary machine from being caused by a disruption of transmission of the control signal over the signal line from the control unit to the variable frequency power means.

2. A variable frequency power system according to claim 1, wherein said rotary machine is a fan for supplying air to a boiler.

3. A variable frequency power system with fault prevention for controlling the rotary speed of a rotary machine driven by an A.C. electric motor by regulating the frequency of an A.C. electric current supplied tothe electric motor, comprising:

a control unit for generating a D.C. electric control signal designating the rotary speed of the rotary machine;

said control unit including an integrating circuit for integrating the control signal to prevent any rate of change of the control signal from having a value outside a predetermined range;

a signal line connected to the output of the integrating circuit for transmitting the control signal;

variable frequency power means for receiving the conrrol signal from the signal line and for generating the A.C. electric current with a frequency which varies in accordance with the magnitude of the control signal;

said variable frequency power means including a change rate detector for detecting the rate of change in the received control signal and for generating a fault signal when the detected rate of change has a value outside the predetermined range;

said change rate detector including two holding circuits for alternately holding by a predetemined cycle the level of the control signal received by the variable frequency power means, a differential voltage detector for detecting the difference between the levels of output signals of the two holding circuits, and a comparator which provides the fault signal when the output signal of the differential voltage detector exceeds a predetermined value; and means responsive to the fault signal of the change rate detector for restricting any change oil the frequency of the variable frequency electric current supplied to the electric motor to prevent any fault in the rotary speed of the rotary machine from being caused by a disruption of transmission of the control signal over the signal line from the control unit to the variable frequency power means.

4. A variable frequency power system with fault prevention for controlling the rotary speed of a rotary machine driven by an A.C. electric motor by regulating the frequency of an A.C. electric current supplied to the electric motor, comprising:

a control unit for generating a D.C. electric control signal designating the rotary speed of the rotary machine;

said control unit including an integrating circuit for integrating the control signal to prevent any rate of change of the control signal from having a value outside a predetermined range;

a signal line connected to the output of the integrating circuit for transmitting the control signal;

variable frequency power means for receiving the control signal from the signal line and for generating the A.C. electric current with a frequency which varies in accordance with the magnitude of the control signal;

said variable frequency power means including a change rate detector for detecting the rate of change in the received control signal and for generating a fault signal when the detected rate of change has a value outside the predetermined range; and means responsive to the fault signal of the change rate detector for switching the power source of the electric motor from the variable frequency power unit to a commericial AC power source.

5. A variable frequency power system according to claim 4, wherein said rotary machine is a fan for supplying air to a boiler.

6. A variable frequency power system with fault prevention for controlling the rotary speed of a rotary machine driven by an A.C. electric motor by regulating the frequency of an A.C. electric current supplied to the electric motor, comprising:

a control unit for generating a D.C. electric control signal designating the rotary speed of the rotary machine;

said control unit including an integrating circuit for integrating the control signal to prevent any rate of change of the control signal from having a value outside a predetermined range;

a signal line connected to the output of the integrating circuit for transmitting the control signal;

variable frequency power means for receiving the control signal from the signal line and for generating the A.C. electric current with a frequency which varies in accordance with the magnitude of the control signal;

said variable frequency power means including a change rate detecor for detecting the rate of change in the received control signal and for generating a fault signal when the detected rate of change has a value outside the predetermined range;

said change rate detector including two holding circuits for alternately holding by a predetemined cycle the level of the control signal received by the variable frequency power means, a differential voltage detector for detecting the difference between the levels of output signals of the two holding circuits, and a comparator which provides the fault signal when the output signal of the differential voltage detector exceeds a predetermined value; and means responsive to the fault signal of the change rate detector for switching the power source of the electric motor from the variable frequency power unit to a commericial AC power source.

7. A variable frequency power system with fault prevention for controlling the rotary speed of a rotary machine driven by an A.C. electric motor by regulating the frequency of an A.C. electric current supplied to the electric motor, comprising:

a control unit for generating a D.C. electric control signal designating the rotary speed of the rotary machine;

said control unit including an integrating circuit for integrating the control signal to prevent any rate of change of the control signal from having a value outside a predetermined range;

a signal line connected to the output of the integrating circuit for transmitting the control signal;

variable frequency power means for receiving the control signal from the signaſ line and for generating the A.C. electric current with a frequency which varies in accordance with the magnitude of the control signal;

said variable frequency power means including a change rate detector for detecting the rate of change in the received control signal and for generating a fault singal when the detected rate of change has a value outside the predetermined range;

means responsive to the fault signal of the change rate detector for raising the output frequency of the variable frequency power unit at a predetermined raising rate up to the upper limit of a predetermined range of frequency control; and means for switching the power source of the electric motor from the variable frequency power unit to a commericial AC power source subsequent to the completion of raising the output frequency of the variable frequency power unit to the upper limit of the predetermined range of frequency control.

8. A variable frequency power system according to claim 7, wherein said rotary machine is a fan for supplying air to a boiler.

9. A variable frequency power system with fault prevention for controlling the rotary spped of a roatry machine driven by an A.C. electric motor by regulating the frequency of an A.C. electric current supplied to the electric motor, comprising:

a control unit for generating a D.C. electric control signal desingating the rotary speed of the rotary machine;

said control unit including an integrating circuit for integrating the control signal to prevent any rate of change of the control signal from having a value outside a predetermined range;

a signal line connected to the output of the integrating circuit for transmitting the control signal;

variable frequency power means for receiving the control signal from the signal line and for generating the A.C. electric current with a frequency which varies in accordance with the magnitude of the control signal;

said variable frequency power means including a change rate detector for detecting the rate of change in the received control signal and for generating a fault signal when the detected rate of change has a value outside the predetermined range;

said change rate detector including two holding circuits for alternately holding by a predtermined cycle the level of the control signal received by the variable frequency power means, a differential voltage detector for detecting the difference between the levels of output signals of the two holding circuits, and a comparator which provides the fault signal when the output signal of the differential voltage detector exceeds a predetermined level; and means responsive to the fault signal of the change rate detector for raising the output frequency of the variable frequency power unit at a predetermined raising rate up to the upper limit of a predetermined range of frequency control; and means for switching the power source of the electric motor from the variable frequency power unit to a commerical AC power soruce subsequent to the completion of raising the output frequency of the variable frequency power unit to the upper limit of the predetermined range of frequency control.

* * * * *

UNITED STATES PATENT AND TRADEMARK OFFICE
CERTIFICATE OF CORRECTION

PATENT NO. : 4,691,156

DATED : September 1, 1987

INVENTOR(S) : Nobuharu Takata

It is certified that error appears in the above-identified patent and that said Letters Patent is hereby corrected as shown below:

Column 9, line 4, "inoluding" should be --including--.

Column 11, line 16, "spped" should be --speed--;

same line, "roatry" should be --rotary--;

line 21, "desingating" should be --designating--.

Signed and Sealed this

Ninth Day of February, 1988

Attest:

DONALD J. QUIGG

Attesting Officer

Commissioner of Patents and Trademarks